United States Patent
Joblin

(10) Patent No.: US 6,202,284 B1
(45) Date of Patent: Mar. 20, 2001

(54) PIPE FITTING

(76) Inventor: John Joblin, 25 Chelsea, Edgecliff, TX (US) 76134

(*) Notice: Subject to any disclaimer, the term of this patent is extended or adjusted under 35 U.S.C. 154(b) by 0 days.

(21) Appl. No.: 09/195,519

(22) Filed: Nov. 18, 1998

(51) Int. Cl.7 .................................................. B21D 39/04
(52) U.S. Cl. ........................ 29/516; 29/890.14; 285/93; 285/382
(58) Field of Search ..................... 285/93, 382, 382.1, 285/382.2, 133.21; 29/516, 890.14, 508, 520, 521, 525

(56) References Cited

U.S. PATENT DOCUMENTS

| | | | |
|---|---|---|---|
| 2,121,558 | 6/1938 | Coe et al. | 29/157 |
| 3,244,441 | * 4/1966 | Caudle | 285/382 |
| 3,596,939 | * 8/1971 | Gibson | 285/133.21 |
| 4,330,924 | 5/1982 | Kushner et al. | 29/458 |
| 4,482,174 | 11/1984 | Puri | 285/382.2 |
| 4,666,190 | * 5/1987 | Yamabe et al. | 285/93 |
| 5,080,406 | 1/1992 | Hyatt et al. | 285/330 |
| 5,090,743 | * 2/1992 | Obering | 285/133.21 |
| 5,452,921 | 9/1995 | Hyatt | 285/23 |
| 5,484,174 | * 1/1996 | Gotoh et al. | 285/382 |

FOREIGN PATENT DOCUMENTS

511527 * 8/1939 (GB) ..................................... 285/382

* cited by examiner

*Primary Examiner*—Dave W. Arola
(74) *Attorney, Agent, or Firm*—Charles D. Gunter, Jr.

(57) ABSTRACT

A metal pipe fitting and a method of fitting pipes together, the metal fitting having at least one mouth opening for receiving a mating length of metal pipe. The pipe fitting comprises a generally cylindrical sleeve having an exterior surface, interior surface, and a proximate end and a distal end. The proximate end forms at least one mouth opening for the fitting. The sleeve has a circumferential groove formed within the interior surface between the proximate and distal ends thereof and a seal ring located within the circumferential groove. There is at least one inspection divet which penetrates the exterior surface of the sleeve to the interior thereof to reveal the exterior of the mating length of metal pipe for verifying the proper insertion of the metal pipe. The proximate end of the sleeve narrows in internal diameter in the direction of the distal end thereof to form a positive stop for the mating length of metal pipe to properly locate the mating length of metal pipe at a desired position within the pipe joint. The pipe joint is then completed by application of a sizing pressure to the sleeve with a pipe fitted therein to engage the sleeve and pipe.

8 Claims, 4 Drawing Sheets

PIPE FITTING

BACKGROUND OF THE INVENTION

1. Field of the Invention

The present invention relates to a fitting for connecting pipes that carry fluid or gas, and more particularly, a fitting that can be connected to a pipe by using a fluid powered sizing apparatus.

2. Description of the Prior Art

Fittings for connecting the ends of pipes are old in the art. The earliest method of fitting two pipes together involved a simple member with an outside diameter that is larger than the pipe to be inserted, creating a snug fit between the two pipes as shown in U.S. Pat. No. 2,121,558. The telescopically inserted pipe could then be either glued are soldered to form a liquid or gas tight seal. The problem with this early design was the inconvenience of using either glue or solder. Further, these pipe fittings did not prove to be adequate for high pressures (above 500 psi).

The earlier pipe fittings were improved upon by creating a member with a complex inner surface that contacted the telescopically inserted pipe. This complex surface consists of such designs as curved grooves as in U.S. Pat. No. 5,080,406, or "teeth" and a lock-ring as in U.S. Pat. No. 4,482,174, or annular grooves as in U.S. Pat. No. 5,452,921. Each of these fittings are designed to operate by inserting a pipe within the complex inner surfaced member and swaging the outer surface of the member. The drawback to these designs is that the inner grooves and teeth create a deformation in the pipe that is inserted. This creates areas of high stress concentrated at specific points in the pipe. It is these high stress areas that are major factors in the incidence of failure in pipe fittings. Furthermore, in order for these fittings to work properly, they must be large and relatively heavy. These characteristics make the prior art fittings undesirable for smaller high pressure fittings.

Other pipe fitting devices can incorporate an "O" ring and adhesives to help form a tight seal as in U.S. Pat. No. 4,330,924. However, this device is also swaged in such a manner as to deform the pipe member that is within the outer fitting member. Also, this and other designs are not as versatile as desired due to the dual nature of the design—both the female (fitting) and male (pipe) portions of the device are designed to work together exclusively. This limits the use of the joint to pipes that are specifically tailored to fit the joint. Thus, while there have been improvements in pipe fittings from the earliest inventions, there is still a need for easier to use fittings. In particular, there is a need for improved fittings for commercial use where qualities such as weight, durability, and low cost are critical factors.

SUMMARY OF THE INVENTION

The present invention consists of a metal pipe fitting, which comprises a generally cylindrical sleeve having an exterior surface and an interior surface. The sleeve has a proximate end and a distal end with the proximate end forming a mouth opening for receiving a mating length of metal pipe the fitting.

Preferably, the sleeve has a circumferential groove formed within the interior surface between the proximate and distal ends, and a seal ring located within the circumferential groove. There is at least one inspection divet which penetrates the exterior surface of the sleeve to the interior thereof to reveal the exterior of the mating length of metal pipe for verifying the proper insertion of the metal pipe. The sleeve narrows in internal diameter in the direction of the distal end to form a positive stop for the mating length of metal pipe to properly locate the mating length of metal pipe at a desired position within the pipe joint.

The seal ring located within the circumferential groove of the sleeve is formed of a resilient material, including but not limited to such materials as polytetrafluoroethylene. There is at least one circumferentially raised portion on the interior and corresponding exterior of the sleeve. The exterior surface of the sleeve is formed in a preselected size which is adapted to be received within the mating jaws of a sizing apparatus. The mating jaws are selectively sized to apply a uniform inwardly directed circumferential pressure to at least a portion of a length of the exterior surface of the sleeve to crimp the sleeve about the mating length of pipe and form a pipe joint.

The metal pipe fitting can be in a T-shaped form with a pair of diametrically opposing mouth openings and a third mouth opening which is arranged at perpendicular position to the diametrically opposing mouth openings, each opening arranged to receive a mating length of pipe. The pipe fitting is formed from a metal including but not limited to copper, steel, stainless steel, and brass.

This invention is also a method of forming a pipe joint comprising the insertion of a mating length of pipe within the mouth of the fitting described above until the mating length of pipe is properly located against the positive stop. Pressure is then applied from a sizing apparatus to the exterior surface of the sleeve to uniformly reduce the sleeve's internal diameter and engage the mating length of pipe within the interior surface of the sleeve.

An object of the present invention is to provide a high pressure fitting for use in a piping joint that allows convenient joining of two ends of a pipe at a variety of angles using a sizing apparatus.

Another object of this invention is to create an easy to use and durable pipe joint for creating a continuous pipe system for transporting liquids and/or gases.

Another object of this invention is to create a pipe joint using the fitting that can withstand high pressure gases or liquids.

Another object of this invention is to form a pipe joint that does not deform the pipe inserted within the fitting upon application of the sizing apparatus.

Another object of this invention is to provide an improved pipe joint for use in the plumbing construction industry.

Additional objects, features and advantages will be apparent in the written description which follows.

DETAILED DESCRIPTION OF THE INVENTION

While the present invention could be directed toward joining pipe sections of varying diameter, it is preferably embodied in a device for forming a pipe connection between two separate pipe sections of equal diameter. Generally, at least two sleeves of the invention, each coupled to a main body of some geometry, are necessary to form a complete connection between two pipe sections. The description, therefore, will be predominantly directed to one end of the device, with reference made to the components of the second end only when necessary to describe some feature of the invention. It is to be understood that the invention is not restricted to use in a device for connecting two pipe sections in a line, but may be used to make a variety of pipe joints and connections. The second end of the fitting could comprise a plug, an elbow, a T-shaped body, a Y-shaped body, or other pipe body configurations.

Figure 1:
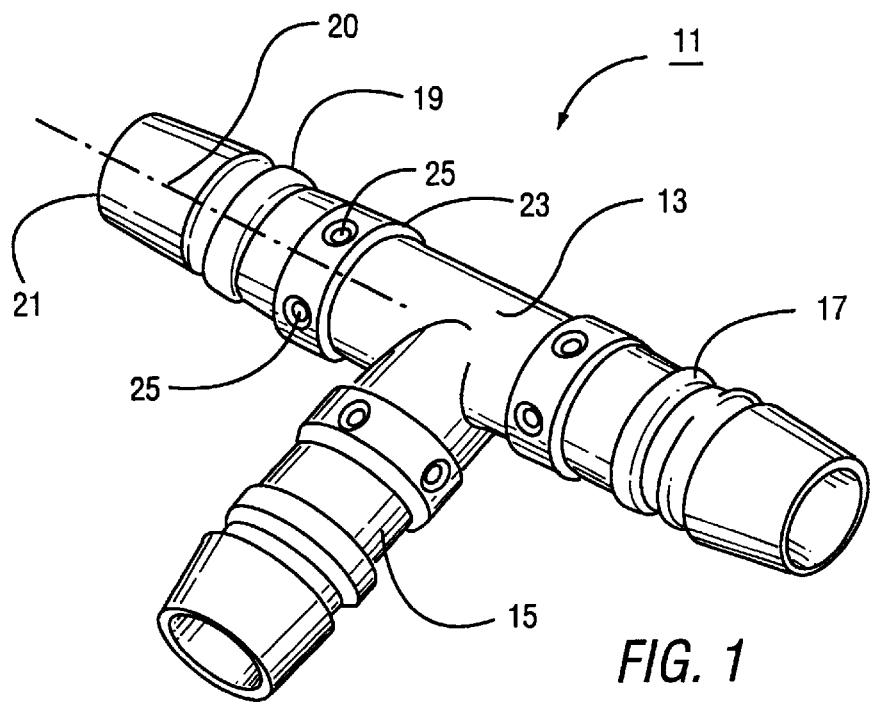
FIG. 1 shows one embodiment of the invention consisting of three fittings which together form a T-shaped joint.

FIG. 1 shows one embodiment of the invention 11. Three sleeves 15, 17 and 19 are attached to a T-shaped main body 13. The parts of sleeve 19 are shown in detail. It is to be understood that these detailed parts apply to the other sleeves of the invention as well. Sleeve 19 is broadly symmetrical about a centerline 20 shown in FIG. 1. The distal end 23 of sleeve 19 is the end of attachment to the body 13, and proximal end 21 is opposite the distal end 23. The proximal end 21 is the point of insertion of a pipe. At distal end 23 is at least one inspection dimple 25 that extends through the pipe. The proximal end 21 is the end through which a pipe can be inserted.

Figure 2:
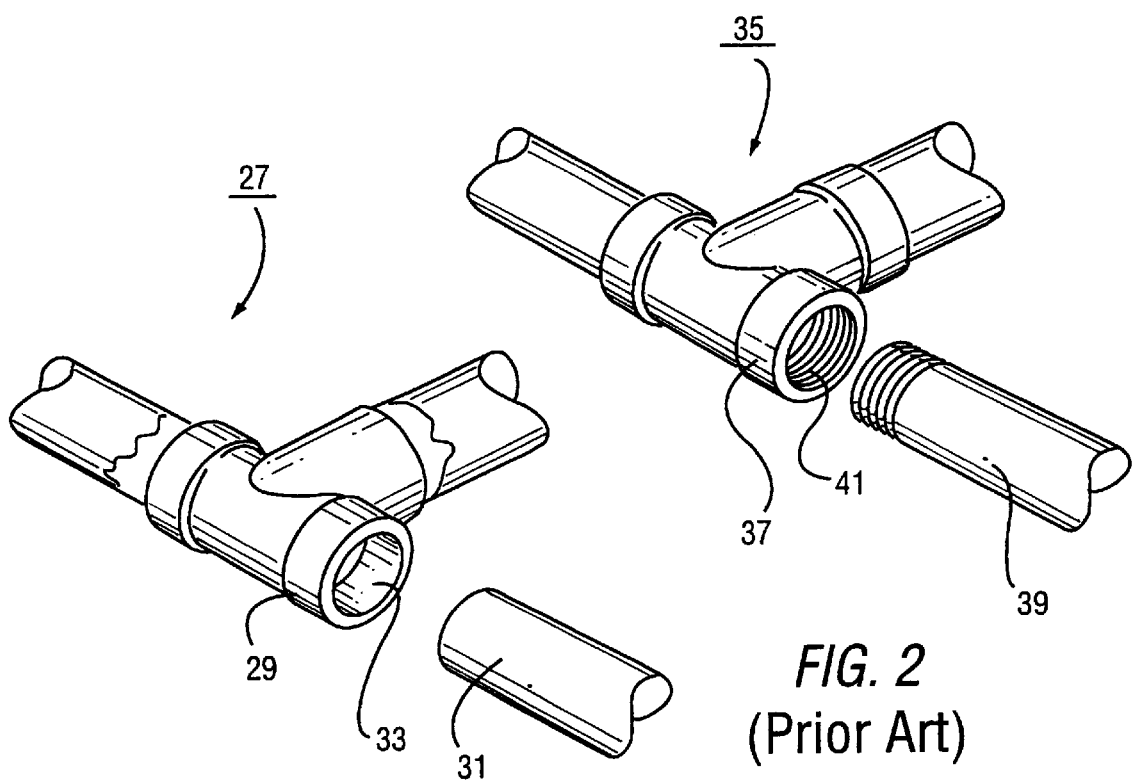
FIG. 2 shows two embodiments of the prior art.

FIG. 2 shows two embodiments 27 and 35 of the prior art. In 27, the fitting 29 has an internal surface 33 that is mated to the outside of pipe 31 and fastened with glue or solder. The internal surface 33 is smooth and attachment with a pipe is effected by the snug fit of a pipe within the internal surface 33, and by a glue or solder. In 35, the fitting 37 has an internal surface that is mated to the outside of pipe 39, each of which have threading to allow fastening one to the other. Welding and silver solder techniques were also used in the prior art for joining fittings such as those shown in FIG. 2.

The preferred embodiment of the invention is shown in FIG. 3A through FIG. 3D. The detailed drawing in FIG. 3A refers to specific portions of the sleeve in the cross-sectional view. It is to be understood that the upper and lower cut-away portions in FIG. 3A through FIG. 3D are mirror images. Sleeve 19 is attached to or integrally formed with the main body 13 at the distal end 23, and the proximal end 21 forms an annular mouth opening for receiving a mating length of pipe 43 in FIGS. 3B through 3D. The sleeve 19 has an inner surface 45 and an exterior surface 47. The proximate end increases in internal and external diameter to form a circumferentially raised portion 79 (FIG. 3A) at the interior and 81 at the exterior portion. A circumferential groove is formed by the interior portion 49 and corresponding exterior portion 51. Seal ring 53 fits into the interior surface 49 of the groove. The seal ring can be made of any resilient material such as polytetrafluoroethylene, and is present in the sleeve to improve the seal formed by the invention.

In one embodiment of the invention, the sleeve 19 has at least one raised portion that translates from the interior surface to the exterior surface. The raised portions do not fit against the exterior surface of a pipe inserted within the sleeve until a sizing pressure is applied. In the embodiment represented in FIGS. 3A through 3D, internal portion 55 and external portion 57 form a circumferential raised portion, as does internal portion 59 and external portion 61. In between the two raised portions is a inspection divet 25. There is at least one inspection divet. A inspection divet 25 penetrates the exterior surface of the sleeve 19 to the interior portion at 67. The raised portion formed by 59 and 61 decreases in diameter distally until it reaches the positive stop formed by the internal portion 63 and external portion 65. When pipe 43 is inserted into sleeve 19, the pipe is pushed until it reaches positive stop at interior portion 63. The inspection divet at 67 is against pipe 43, as is seal ring 53, forming a seal circumferentially around pipe 43. The pipe 43 can be viewed through the inspection divet 25. The interior surface 45 is such that the diameter of sleeve 19 fits snugly around pipe 43 when placed within the interior except for the raised portions.

Figure 3A:
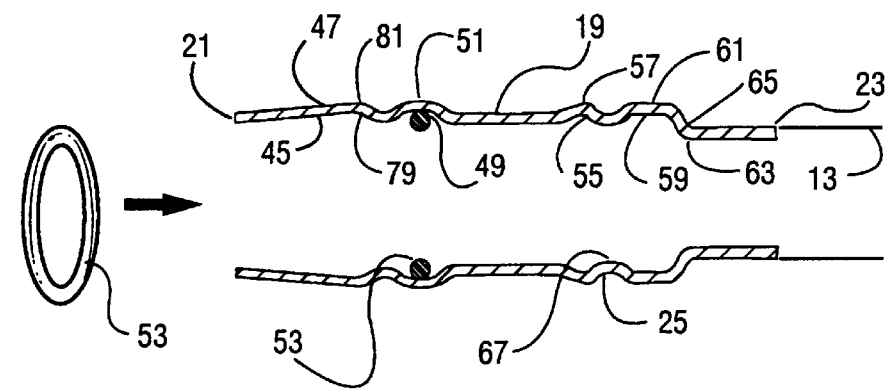
FIGS. 3A through 3D are simplified, schematic views, in cross section, showing the sleeve of the invention, a pipe being inserted into the sleeve, and the engagement of the sleeve and pipe using the sizing apparatus, respectively.
Figure 3B:
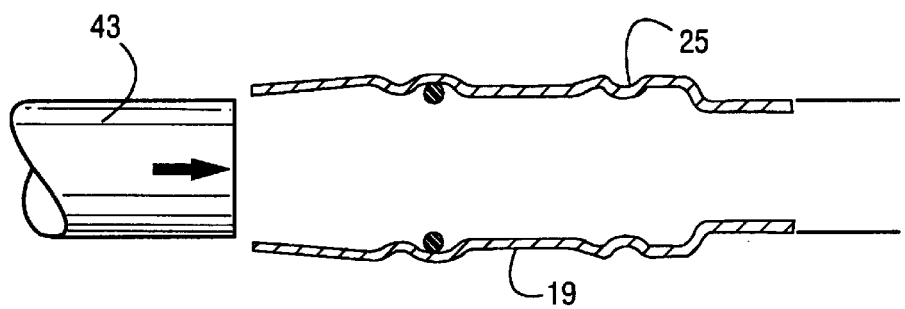
Figure 3C:
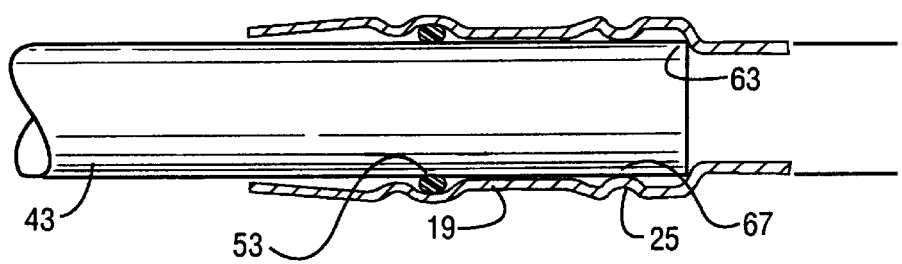
Figure 3D:
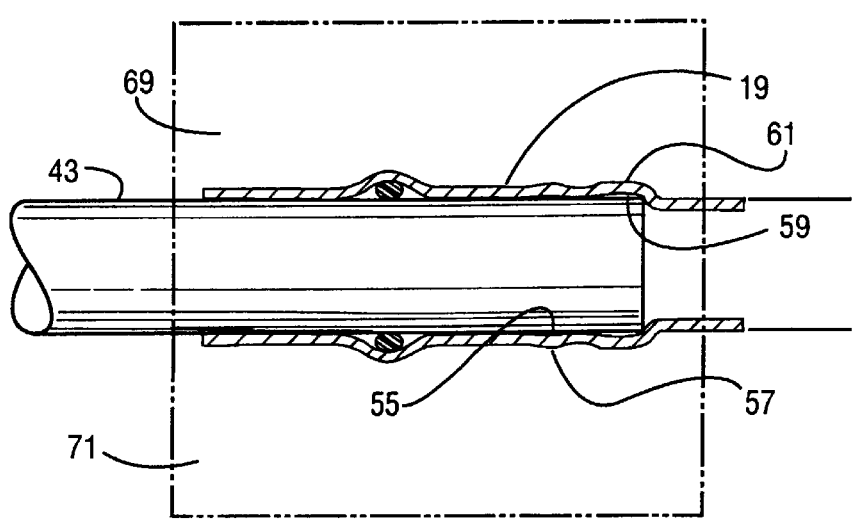

FIG. 3D shows the results of application of a uniform force on the exterior 47 of sleeve 19 using the sizing apparatus die members 69 and 71 (shown in phantom lines). The application of uniform pressure on the surface 47 of the sleeve 19 mates the internal surface 45 of the sleeve with the pipe 43. The raised portions formed by 79 and 81, 55 and 57, and 59 and 61 are molded to the shape of the pipe 43 inserted therein, while the inspection divet 25 (inset) shows the location of the pipe within the sleeve which is molded against the internal portion 67 at the divet opening. The seal 53 is molded against pipe 43 by application of the sizing pressure which flattens the groove formed by interior portion 49 and exterior portion 51.

Figures 4, 5:
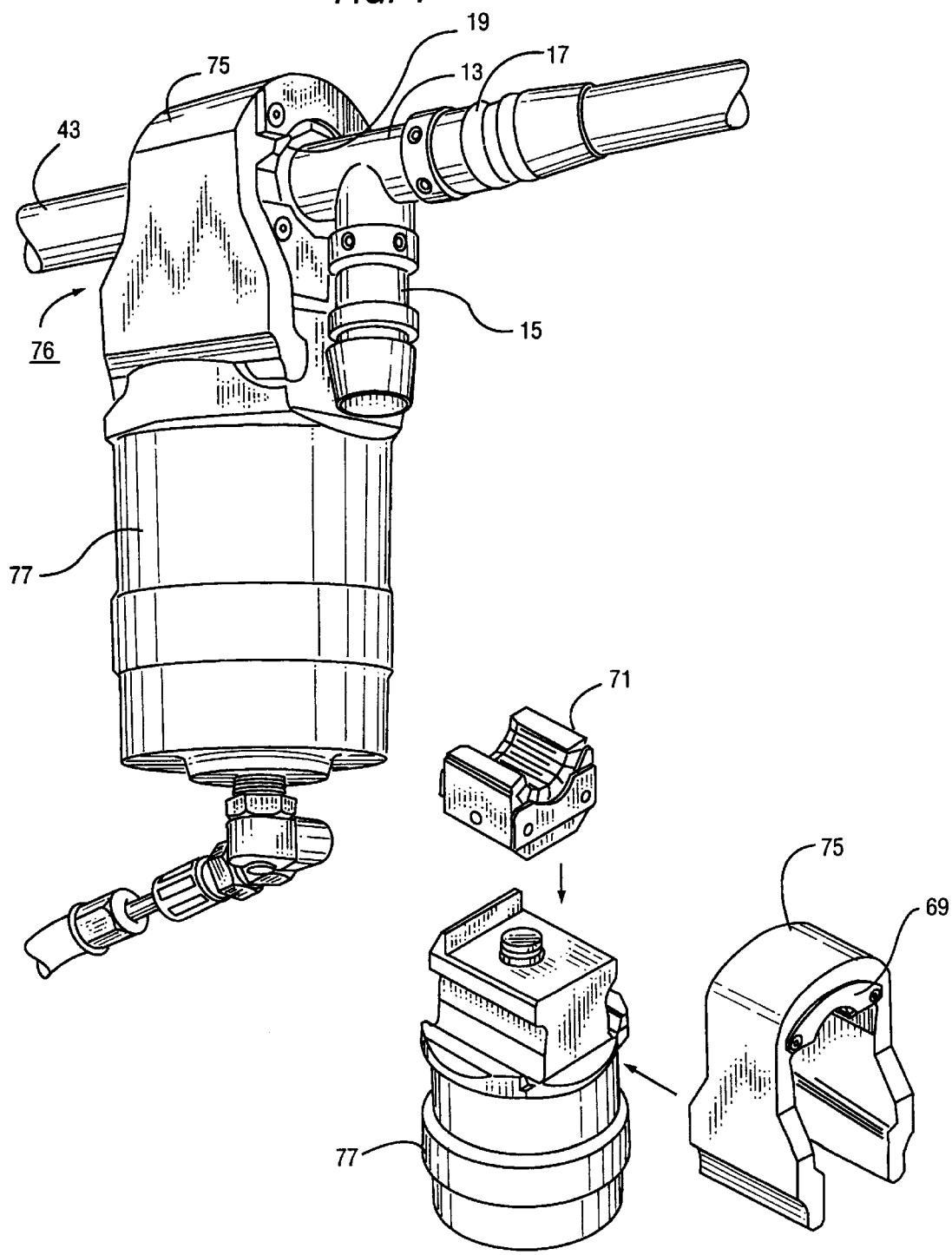
FIG. 4 is a view of the sizing apparatus in position to apply the sizing pressure to the sleeve.
FIG. 5 is an isolated view of the removable sizing apparatus head showing the components thereof.

The application of the sizing force is shown in FIG. 4. The T-shaped body 13 with attached sleeves 15, 17 and 19 is shown with a portion thereof engaged by a sizing apparatus 76. The sizing apparatus has two primary parts: a removable head 75 and the power unit 77. The head 75 can be detached from the power unit 77 as shown in FIG. 5. This allows the removal of the sizing apparatus after the sizing pressure is applied and the joint is complete. The sizing apparatus is applied to sleeve 19 with pipe 43 inserted within. The head of the sizing apparatus contains die members consisting of a upper member 69 and lower member 71. These die members are fitted to the external 47 shape of the sleeve 19. Once in place as in FIG. 4, the die members uniformly transfer the force applied from the sizing apparatus.

Figures 6A, 6B:
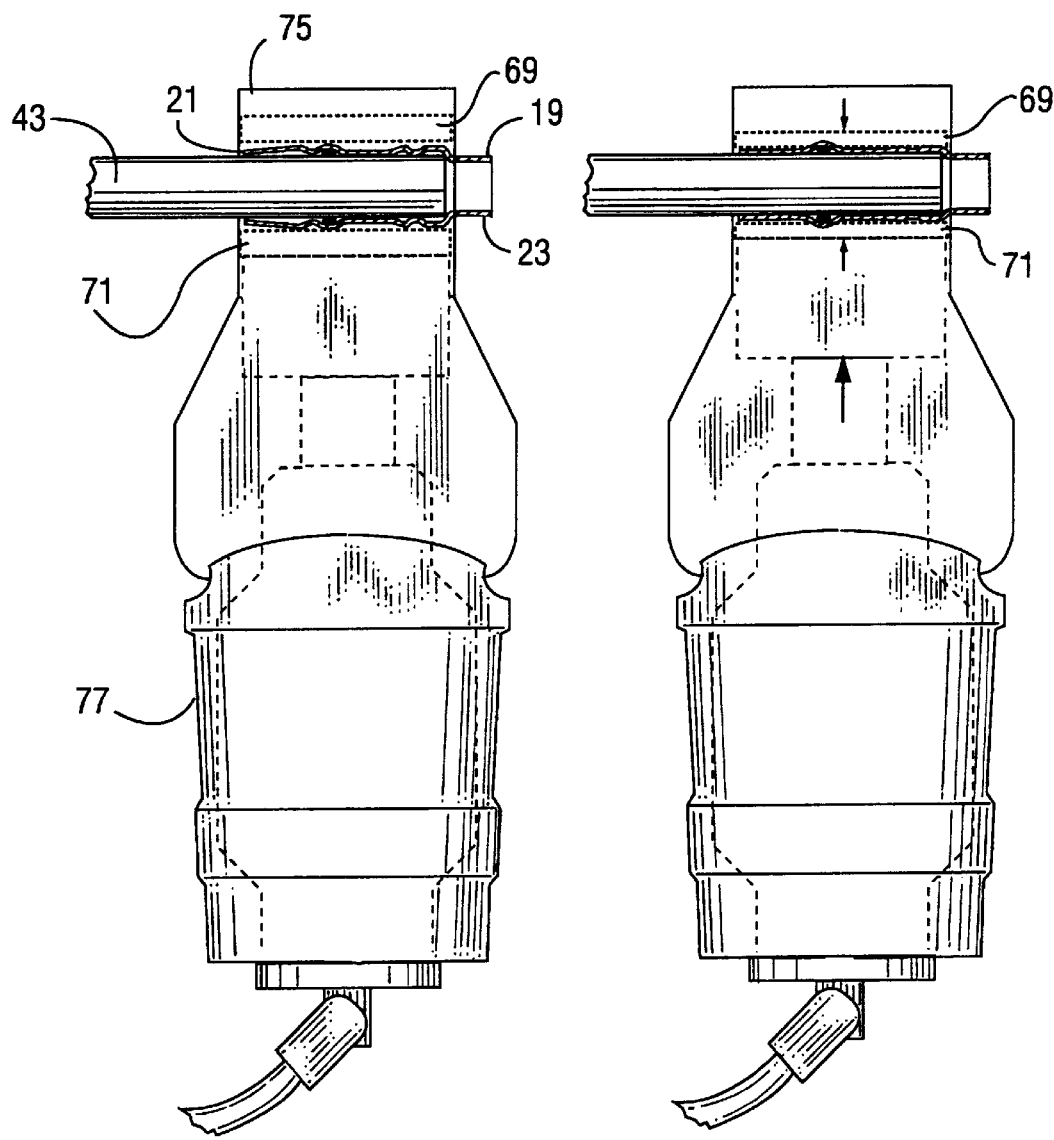
FIGS. 6A and 6B are simplified, cross-sectional views of the sizing apparatus shown being used to apply the sizing pressure to the sleeve with a pipe inserted into the sleeve of the fitting of the invention.

The application of force to the sleeve 19 and inserted pipe is shown in FIGS. 6A and 6B. The cross-sectional view shows the sizing apparatus fitted around the sleeve 19 and inserted pipe 43. The upper die member 69 and lower die member 71 fit around the sleeve 19. As force is applied upward from the power unit 77 of the apparatus, force is transferred through die member 75 to the sleeve 19, while the head 75 transfers force downward onto die member 69. This force engages the mating length of pipe within the sleeve, molding the raised portions of the sleeve 19 against the pipe 43. The die members 69 and 71 are designed such that when pressure is applied from the power unit the die members absorb the pressure evenly throughout the two die members. This in turn puts a uniform circumferential pressure upon the exterior 47 of the pipe fitting 19, forming a tight seal around the pipe 43 and completely engaging pipe 43 and pipe fitting 19.

Once the application of the sizing pressure is complete, the sizing apparatus can be removed from the pipe and pipe fitting by removing the head 75 from the power unit 77 as shown in FIG. 5. Once the head 75 is removed, the upper 69 and lower 71 portions of the die members can be separated. This procedure allows easy sizing and subsequent removal of the sizing apparatus after the sizing pressure is applied.

The pipe fitting is designed to be easily installed and easily removed in several steps. First, a pipe is measured and then cut with a chop saw. Second, the pipe is inserted within the sleeve at the distal end. Third, the sleeve is sized preferably using a hand held pneumatic sizing apparatus. Finally, the sizing apparatus is removed, leaving a pipe fitting that is completely engaged with the inserted pipe. Once formed, the joint is suitable for carrying, for example, natural gas, LP gas, air, heated and chilled water, medical, non-medical oxygen and other medical and non-medical gases and liquids. The pipe joint is capable of holding over 1000 psi, and can be formed in under 30 seconds. Thus, the present invention creates an easy to use, durable pipe fitting that is ideal for commercial and building construction use. These features of the invention are an improvement from past pipe fittings for similar use.

While the invention has been shown in only one of its forms, it is not thus limited but is susceptible to various changes and modifications without departing from the spirit thereof.

What is claimed is:

1. A method of forming a pipe joint from a pipe fitting having at least one mouth opening and at least a single length of mating metal pipe, the method comprising the steps of:

providing a generally cylindrical sleeve having an exterior surface and an interior surface, the sleeve having a proximate end and a distal end defining a length therebetween, the proximate end forming the at least one mouth opening for the fitting;

forming a circumferential groove within the interior surface of the sleeve between the proximate and distal ends thereof;

locating a seal ring within the circumferential groove;

providing at least one inspection divet located between the circumferential groove and distal end of the sleeve which penetrates the exterior surface of the sleeve to the interior thereof to reveal an outer surface of the mating length of metal pipe for verifying the proper insertion of the metal pipe;

forming the proximate end of the sleeve so that it narrows in internal diameter in the direction of the distal end thereof to form a positive stop for the mating length of metal pipe to properly locate the mating length of metal pipe at a desired portion within the pipe joint;

inserting a mating length of pipe within the mouth opening of the fitting until the mating length of pipe is properly located against the positive stop;

applying a uniform circumferential sizing pressure to the exterior surface of the sleeve along substantially the entire length thereof including said inspection divet to uniformly reduce the sleeve's external and internal diameter and engage the mating length of pipe within the interior surface of the sleeve.

2. The method of claim 1, wherein the pipe fitting has at least one circumferentially raised portion on the interior surface and corresponding exterior surface of the sleeve.

3. The method of claim 2, wherein the circumferentially raised portion is reduced in external and internal diameter once the mating length of pipe is inserted and the sizing pressure is applied by the sizing apparatus.

4. The method of claim 1, wherein the pipe fitting is formed from a metal selected from the group consisting of copper, steel, stainless steel, and brass.

5. The method of claim 1, wherein the mouth openings of the pipe fitting are in the range of ⅜ inch to 2 inches.

6. The method of claim 5, wherein the pressure ratings of the pipe and pipe fitting are up to about 1000 psi.

7. The method of claim 1, wherein the sizing pressure is in the range of 1200 psi to 1600 psi.

8. The method of claim 7, wherein the sizing apparatus has a detachable head to allow it to be removed from the length of mating pipe once the joint has been formed.

* * * * *